United States Patent
Overley et al.

(10) Patent No.: US 7,818,081 B2
(45) Date of Patent: Oct. 19, 2010

(54) METHOD FOR OPTIMIZING A MANUFACTURING PROCESS HAVING A PLURALITY OF INTERCONNECTED DISCREET OPERATING STATIONS

(75) Inventors: Matthew Bernard Overley, Deerfield Township, OH (US); Brian Kelly Bell, Mableton, GA (US)

(73) Assignee: The Procter & Gamble Company, Cincinnati, OH (US)

( * ) Notice: Subject to any disclaimer, the term of this patent is extended or adjusted under 35 U.S.C. 154(b) by 394 days.

(21) Appl. No.: 12/122,953

(22) Filed: May 19, 2008

(65) Prior Publication Data

US 2009/0287330 A1    Nov. 19, 2009

(51) Int. Cl.
- G06F 19/00    (2006.01)
- G06F 9/44    (2006.01)
- B23P 21/00    (2006.01)

(52) U.S. Cl. .................. 700/96; 700/100; 700/111; 705/7

(58) Field of Classification Search .............. 700/96, 700/100, 103, 108, 111; 705/7
See application file for complete search history.

(56) References Cited

U.S. PATENT DOCUMENTS

| | | | |
|---|---|---|---|
| 5,089,970 A | 2/1992 | Lee et al. | |
| 5,229,948 A | 7/1993 | Wei et al. | |
| 6,256,544 B1 | 7/2001 | Weissinger | |
| 6,317,643 B1 * | 11/2001 | Dmochowski | 700/121 |
| 6,411,859 B1 * | 6/2002 | Conboy et al. | 700/101 |
| 6,715,265 B2 * | 4/2004 | Franzaroli | 53/435 |
| 6,909,936 B2 | 6/2005 | Franzaroli | |
| 7,171,281 B2 | 1/2007 | Weber et al. | |
| 7,316,145 B1 * | 1/2008 | Shore et al. | 72/228 |
| 2004/0148047 A1 * | 7/2004 | Dismukes et al. | 700/100 |
| 2006/0231295 A1 * | 10/2006 | Yamaguchi et al. | 177/25.18 |
| 2007/0198135 A1 * | 8/2007 | Chang et al. | 700/300 |
| 2008/0009959 A1 * | 1/2008 | Enright et al. | 700/96 |

FOREIGN PATENT DOCUMENTS

EP    0 614 814 B1    5/2000

* cited by examiner

Primary Examiner—Charles R. Kasenge
Assistant Examiner—Jason Lin
(74) Attorney, Agent, or Firm—Peter D. Meyer

(57) ABSTRACT

A process to control product throughput in a multi-station manufacturing system is disclosed. The process comprises the steps of: providing the manufacturing system as a plurality of discrete operating stations; separating the plurality of pathways into a plurality of independent pathways; identifying a first constraining throughput capacity corresponding to each of the plurality of independent pathways; adjusting a target rate of each of the discrete operating stations in each of the plurality of independent pathways according to the corresponding first constraining throughput capacity; reconstituting the plurality of independent pathways into an interconnected pathway comprising the discrete operating stations; reforming the plurality of pathways for the object of manufacture to pass from the first operating station to the distal operating station; combining the target rate of each of the discrete operating stations of the interconnected pathways; and, adjusting product throughput according to the combined target rates.

20 Claims, 7 Drawing Sheets

METHOD FOR OPTIMIZING A MANUFACTURING PROCESS HAVING A PLURALITY OF INTERCONNECTED DISCREET OPERATING STATIONS

FIELD OF THE INVENTION

This invention relates to the art of modeling manufacturing systems and more particularly to the art of developing analytical models for optimizing manufacturing systems in order to optimize process variables within the system. The present invention also relates to a method of operation, control, and system integration of a plant for producing, conveying, and packaging articles.

BACKGROUND OF THE INVENTION

In serial manufacturing systems, manufacturing stages are generally separated by storage spaces used for temporary storage and transport, for example conveyors or other queueing techniques. Each manufacturing stage can comprise one or more manufacturing operations for the assembly of, or for the manufacture of, components or products.

For example, plants for producing and packaging rolls of materials that are convolutely wound upon a support core may comprise a plurality of individual manufacturing operations. These operations then produce rolls, packages, bundles, cases, or pallets of consumer-ready finally wound products. For instance, rolls of materials, such as rolls of paper material or the like, can be wound on a support core, such as a cardboard core tube. Such rolls of consumer-ready finally wound products are preferably rolls of toilet paper, paper toweling, aluminum foiling, and other such materials suitable for personal, domestic, industrial use, or the like. Other examples of serial manufacturing systems can include plants for producing and packaging bags, bottles, and cartons of consumer-ready products such as food, cosmetics, parts, toys, or medicaments.

Machinery suitable for forming rolls of materials can generally comprise a series of operative sections that produce coils or logs of rolled material where the individual consumer-ready finally wound products are generated. Typically, the starting materials for such consumer-ready finally wound products are provided from a paper mill in the form of large sized rolls of convolutely wound web materials. The machinery used for the production of such consumer-ready finally wound products may have an initial unwind section that unwinds the starting material from the large roll and transfers it to successive sections in which the product can be embossed in order to increase the apparent thickness, or change the appearance, of the web material and the resulting consumer-ready finally wound product. Downstream of such an embossing section, several layers of the starting material (processed or otherwise) may be cooperatively coupled in a face-to-face relationship and presented to a recoiling section that receives elongate support cores upon which the material produced by the upstream sections is convolutely disposed about to a desired diameter corresponding to that of the rolls of consumer-ready finally wound products to be produced. The elongate cores having material convolutely wound thereabout can then be introduced to a successive section for either storing the resulting wound web material as elongate rolls of convolutely wound material or sent directly to another manufacturing system that cuts the elongate roll of convolutely wound material into shorter rolls of consumer-ready finally wound product.

Machinery that provides for the transverse cutting of the elongate convolutely wound material into shorter pieces of convolutely wound material (known to those of skill in the art as a log saw) may then be followed by an endless variety of packaging machines that can collect the individual rolls of convolutely wound web material and, either individually or in packaged groups, encapsulate the roll or group of rolls with a film of plastic or paper material. The packs can contain a preselected number of the resulting consumer-ready finally wound product ordered in rows which can be arranged in multiple layers or in any other desired arrangement. The packaged groups or individual rolls of convolutely wound web material can then be collected and contained in still larger groups by cartoning processes or in still larger groups by an ensuing palletizing processes.

Manufacturing operations where the consumer-ready finally wound product sold to consumers is produced and packaged generally use machinery produced by different manufacturers. This may occur because the machinery is acquired at different times or the specific machinery was selected to provide certain advantageous characteristics that relate to the entire manufacturing process and/or to the desired consumer-ready finally wound product.

In such operations, there can be problems associated with coordinating the operation between different machines for different processes. This can include coordinating the operation between roll forming machines and packaging machines as well as between the packaging machine and the various and extensive conveyor belts connecting them. These issues can cause the actual yield of the manufacturing process to be diminished and may not allow sufficient exploitation of the high working rate potential of the individual components of an entire manufacturing process.

Also, the various components of a manufacturing process can be subject to equipment malfunction or the requirement of down time in order to facilitate maintenance. In such systems, it is not uncommon to have one unit operation process sufficient product in order to satisfy the in-feed requirements of a plurality of machines connected to its output. Thus, when an operating event occurs, such as a planned intervention of a particular unit operation of a manufacturing system or a failure of such a unit operation, the production rate of a unit operation providing product to a plurality of unit operations must necessarily be adjusted. Exemplary planned interventions can include preventative maintenance, cleaning, changeover, and curtailment. Unit operation failures may be of a mechanical, electrical, process, or operational nature.

For the sake of comparison, most manufacturing systems operate as a group of unit operations that operate independently of adjacent unit operations. For example, a unit operation may monitor its in-feed status in order to maintain a pre-determined target level or range. Without knowledge of the state and/or speed of any adjacent upstream unit operation(s), the unit operation is unable to determine the best speed to run. Because of this, the unit operation can make unnecessary process speed adjustments. This can result in the unit operation starving itself in one instance or blocking upstream unit operation(s) in another. At times, this can lead to significant, or even perpetual, cycling between the various unit operations comprising the manufacturing system. These non-steady-state conditions have been found to both reduce the speed of the unit operation as well as its reliability thereby greatly impacting throughput of the entire manufacturing system. Traditionally, what has been done to alleviate these non steady-state problems is to increase the amount of conveyor or the size of the queue between the various unit operations. This solution is expensive and reduces operability, introduces greater variability in in-feed conditions (level, backpressure, product distortion), and does not always solve the problem of cycling or unnecessary speed adjustments. This is especially true if the conveyor or queue between the unit operations is not controlled properly.

Another downfall of today's systems is that they do not readily adapt to new products or configurations. Typically, control attributes such as unit operation rates, conveyor speeds, so-called photoeye blocked/cleared timer delays, and path/routing logic must be consistently and constantly added or updated. This can require a significant amount of programming, and at times it requires a complete overhaul of a manufacturing system's control logic. As a result, a significant amount of throughput is lost during the startup and debug of the process on the new product/configuration. Many times this process yields sub-optimal integration of the manufacturing system, and often, the changes have adverse effects on other existing products and manufacturing system configurations. This can cause lost throughput on all future production. Eventually, the manufacturing system and its corresponding control strategy can become too complex and the manufacturing operation is forced to reduce complexity by reducing flexibility, and therefore system capability, in order to achieve some minimum level of system reliability.

What is clear is that the prior art is remarkably silent in providing solutions that facilitate an in situ change in a manufacturing process, coordinating a simultaneous speed change of the effected unit operations, maximizing product throughput, as well as accommodating the interruption of production capacity caused by the shutdown or malfunction of a particular unit operation, while utilizing an algorithm that can be applied consistently to a broad range of system configurations and interconnectivities. It is believed that providing such a unique process can result in a standard solution that can be applied to both like and unlike systems by providing improved flexibility to run various products and paths, maximize throughput by ensuring the system constraint or constraints are running at or most near their maximum speed(s), maximize reliability by reducing or eliminating unnecessary unit operation speed changes, and reducing conveyor lengths by providing more consistent product flow through the system. The reduction of conveyor length can further lead to the reduction of the manufacturing system capital costs, the reduction of the manufacturing system footprint, and improved manufacturing system productivity. What will be realized is that the invention disclosed herein can provide all of the aforementioned benefits while reasonably accommodating various situations in a manufacturing process that can cause an interruption in production.

SUMMARY OF THE INVENTION

The present invention provides a process to control the product throughput in a multi-station manufacturing system. The process comprises the steps of first, providing the multi-station manufacturing system as a plurality of discrete operating stations. Each of the plurality of discrete operating stations has a known rate capacity and is interconnected to form a plurality of pathways for an object of manufacture to pass through the multi-station manufacturing system from a first operating station to a distal operating station. Next, the plurality of pathways are separated into a plurality of independent pathways. Third, a first constraining throughput capacity corresponding to each of the plurality of independent pathways is identified. Fourth, a target rate of each of the discrete operating stations in each of the plurality of independent pathways is adjusted according to the corresponding first constraining throughput capacity. Next, the plurality of independent pathways is reconstituted into an interconnected pathway comprising the discrete operating stations and the plurality of pathways for the object of manufacture to pass through the multi-station manufacturing system from the first operating station to the distal operating station are reformed. Next, the target rate of each of the discrete operating stations of the interconnected pathway is combined. Finally, the product throughput is adjusted according to the combined target rates.

The present invention also provides a process to control product throughput in a multi-station manufacturing system. The process comprises the steps of first providing the multi-station manufacturing system as a plurality of discrete operating stations where each of the plurality of discrete operating stations has a known rate capacity and is interconnected to form a plurality of pathways for an object of manufacture to pass through the multi-station manufacturing system from a first operating station to a distal operating station. Second, the plurality of pathways is separated into a plurality of independent pathways. Third, a first constraining throughput capacity corresponding to each of the plurality of independent pathways is identified. Fourth, a target rate of each of the discrete operating stations in each of the plurality of independent pathways is adjusted according to the corresponding first constraining throughput capacity. Fifth, a second constraining throughput capacity for discrete operating stations common to each of the independent pathways is identified. Next, the target rate of each of the discrete operating stations in the multi-station manufacturing system is adjusted according to the second constraining throughput capacity. Then, the plurality of independent pathways is reconstituted into the interconnected pathway comprising the discrete operating stations and the plurality of pathways for the object of manufacture to pass through the multi-station manufacturing system from the first operating station to the distal operating station is reformed. Finally, the product throughput is adjusted according to the combined target rate.

DETAILED DESCRIPTION OF THE INVENTION

The present invention provides a method for maximizing product throughput and determining the optimal operating speeds for a plurality of interconnected machines operating within a manufacturing system. The individual machines of the manufacturing system are typically provided as a plurality of discrete operating stations and may be arranged in any number of configurations and be provided in any desired quantity. In a preferred embodiment, each machine within a manufacturing system has its own local control unit and variable speed control that communicates with a master control unit where the processes described herein are executed, and the user enters certain process variables required by the master control unit via a master operator interface.

Figure 1:
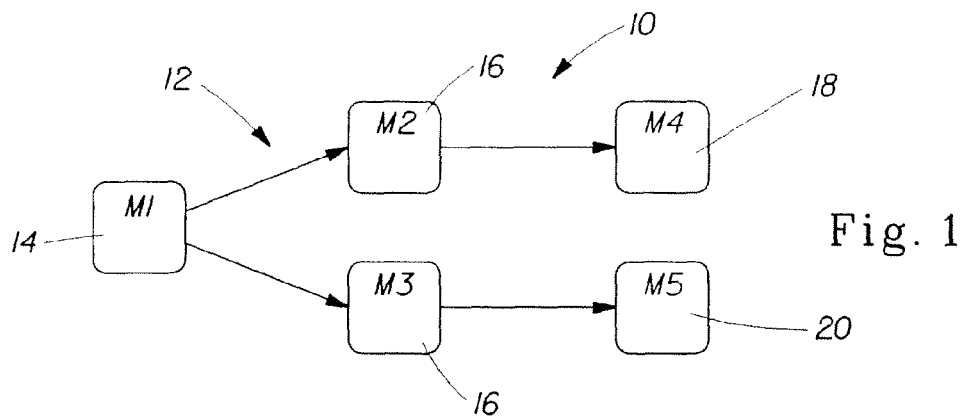
FIG. 1 is a block diagram of an exemplary manufacturing system.

In short, the connectivity of a manufacturing system is defined in the inventive process as the set of independent paths that a consumer-ready finally wound product of manufacture would travel. Referring to FIG. 1, an exemplary process 10 could utilize a manufacturing system 12 (also used interchangeably with the term "system 12" herein) that is suitable for the manufacture of convolutely wound paper products, for example. Such a system 12 could comprise in an exemplary, but non-limiting, embodiment a log saw 14, at least one wrapper 16, a bundler 18, and a case packer 20. In principle, an elongate convolutely wound material disposed about a core would be processed first by a log saw 14. The log saw 14, in principle, transversely cuts the elongate convolutely wound web material into a plurality of shorter, consumer-ready finally wound lengths of convolutely wound material. An exemplary wrapper 16 could envelop each individual consumer-ready finally wound length of convolutely wound web material with an overwrap. Typically, a polymeric film is used in order to encapsulate each consumer-ready finally wound convolutely wound web material. Next, an exemplary bundler 18 could effectively bundle a plurality of consumer-ready finally wound convolutely wound web materials into an array of products that could be eventually encapsulated in yet another thicker and more durable polymeric film. Such an encapsulated array of products would be suitable for sale at a warehouse or other merchandising operation for the consumer to buy the consumer-ready finally wound convolutely wound product in bulk. Further, an exemplary case packer 20 could be capable of taking a plurality of consumer-ready finally wound convolutely wound products and place them within a carton for containing the individual finally wound consumer-ready products for the eventual transport of individual products to merchandising outlets and the ultimate sale of the individual consumer-ready finally wound products to consumers.

As can be seen from FIG. 1, the output of log saw 14 can feed the input of a plurality of manufacturing unit operations. In the example provided herein, the output of log saw 14 is directed in two streams toward the input of a plurality of wrappers 16, although it should be realized and readily apparent to one of skill in the art that virtually any number or type of machines (also referred to herein as "unit operations") and any manner of connecting inputs and outputs of such a unit operations are suitable for use with the present invention.

Figure 2:
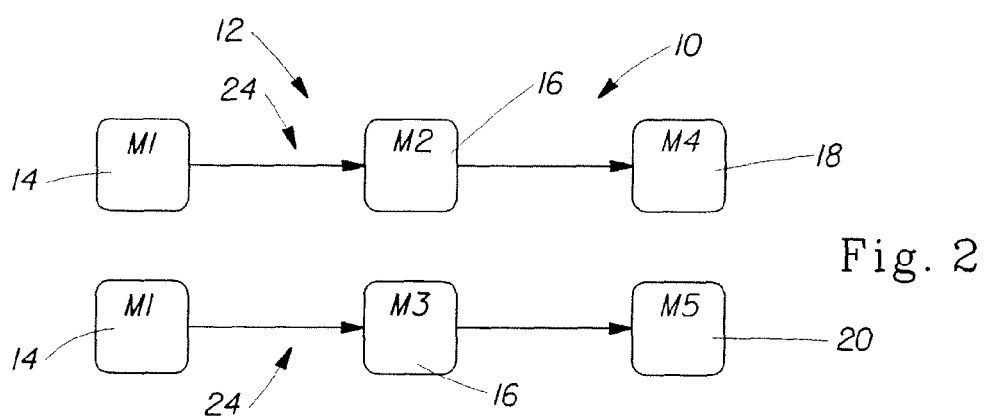
FIGS. 2-8 are block diagrams representing the steps of the instant invention that can maximize production throughput of the exemplary manufacturing system of FIG. 1 as well as accommodate for the interruption of service due to a planned or unplanned intervention or failure of equipment used to manufacture the consumer-ready finally wound product contemplated herein.
Figure 2:
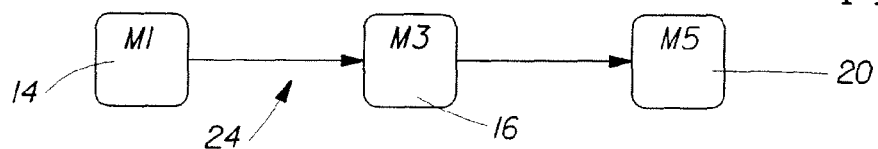

Turning now to FIG. 2, the process 10 of the instant invention provides that the system 12 be displayed as a plurality of independent paths 24 in which a consumer-ready convolutely wound product may progress through system 12. By way of example, it was noted with reference to FIG. 1 above that the output of log saw 14 provided product to the input of a plurality of wrappers 16. Thus, since one unit operation of system 12 provides for relative distribution of the output therefrom to a plurality of devices, the system 12 can be represented as a plurality of independent paths 24 where each unit operation of the system 12 is represented within each independent path 24 through which the consumer-ready final product may progress through system 12. In other words, a consumer-ready product may successively progress from the output of log saw 14 to a first wrapper 16 and then to a bundler 18 or the consumer-ready product may successively progress from the output of log saw 14 to a second wrapper 16 and then a case packer 20.

Figure 3:
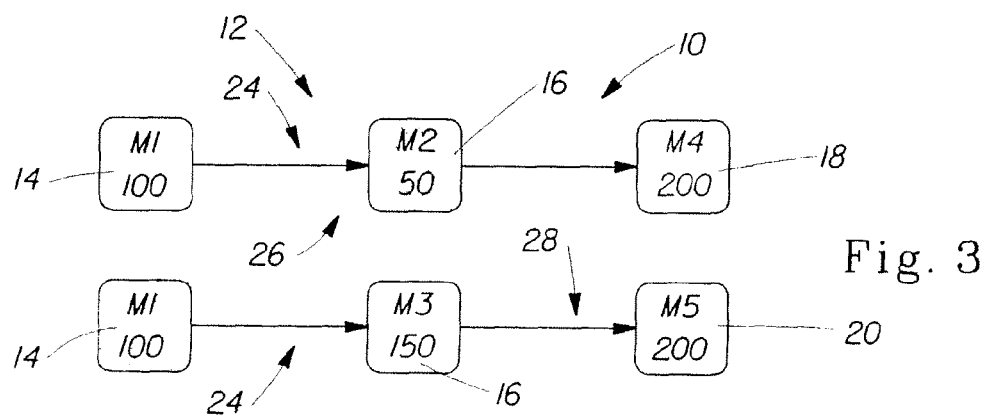

Referring to FIG. 3, the rate capacity (also used interchangeably herein with "maximum rate" or "capacity") of each unit operation of system 12 in each independent path 24 is then determined. This information can be provided by the manufacturer of the specific equipment or may be realized through use and experience as an evaluative known output of the specific equipment. By way of non-limiting example, the known output of a log saw 14 (represented as M1) may be 200 units/minute, the throughput of a first wrapper (represented as M2) may be 50 units/minute, and the output of the second wrapper 16 (here represented as M3) may be 150 units/minute. Similarly, the capacity of exemplary bundler shown may be 200 units/minute and the exemplary case packer shown as 200 units/minute. In any regard, the rate capacity at each unit operation of the system 12 is likely the maximum rate for the specific equipment for the given format of consumer-ready product as well as any applicable system conditions. Preferably, the maximum rate is provided by the unit operation automatically and takes into account both mechanical and process limitations, therefore eliminating the possibility of erroneous data entry by an operator or any control scheme utilized to control the unit operation.

If a specific piece of manufacturing equipment (or unit operation) appears in a plurality of independent pathways 24 (in this example log saw 14 (M1)), the maximum capacity of the machinery should be divided according to the number of appearances of that specific equipment per number of independent paths 24 in which that specific machinery appears. Thus, if the capacity of log saw 14 (M1) is 200 units/minute, by way of the example provided herein, the maximum speed per path of the log saw is 100 units/minute. By way of convention, the capacity of each piece of equipment is generally reflected with common units. For example, for a manufacturing system such as that contemplated herein, the common units may be rolls per minute, pieces per minute, articles per hour, and the like.

Referring again to FIG. 3, next the constraining throughput capacity of each independent path 24 is identified. Typically, the constraint is determined by identifying the manufacturing equipment having the lowest rate capacity. By way of example and as shown in FIG. 3, the constraint of the upper independent path 26 would be identified as the wrapper 16 (M2). This is because the capacity of the wrapper 16 (M2) has the lowest capacity of all equipment present in the upper independent path 26. Likewise, the constraint in the lower independent path 28 shown in FIG. 3 is log saw 14 (M1). This is because the log saw 14 has the lowest capacity of all the equipment present in the lower independent path 28 represented therein.

Figure 4:
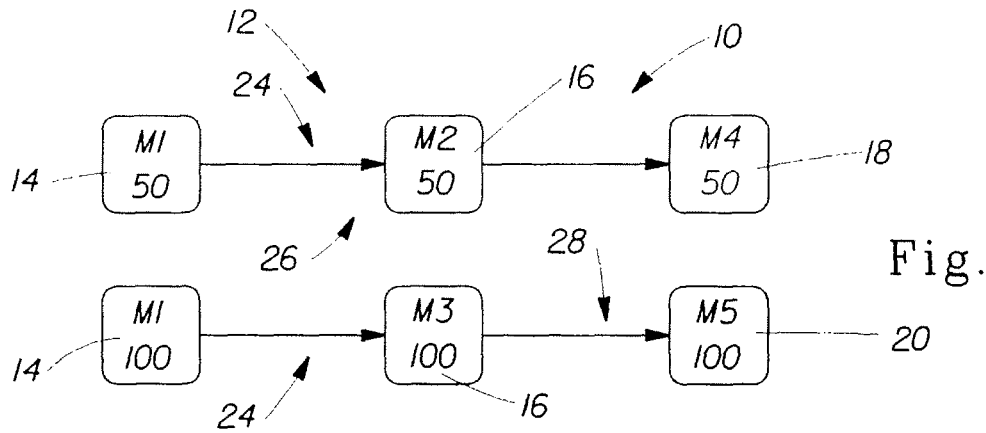

Referring to FIG. 4, next the target rate of each piece of equipment in each independent path 24 is determined. In other words, at this point in the process, each independent path 24 transitions from understanding the rate capacity of each piece of equipment located in that independent path 24 to determine the target rate to command each piece of equipment in that associated independent path 24 to operate. By way of example, in the upper independent path 26 of FIG. 4, since the constraint is wrapper 16 (M2) having a capacity of 50 units/minute, all other equipment located in the independent path 26 should have a target rate that is adjusted to be commensurate in scope with that constraining piece of equipment (here, wrapper 16 (M2)). Thus, the target rate of the log saw 14 (M1) is adjusted downward from its initial capacity of 100 units/minute to 50 units/minute. Similarly, since the constraint in the lower independent path 28 of FIG. 4 is the log saw 14 (M1), the target rates of the wrapper 16 (M3) and case packer 20 (M5) are adjusted accordingly to be commensurate with the constraining capacity of log saw 14 (M1).

Figure 5:
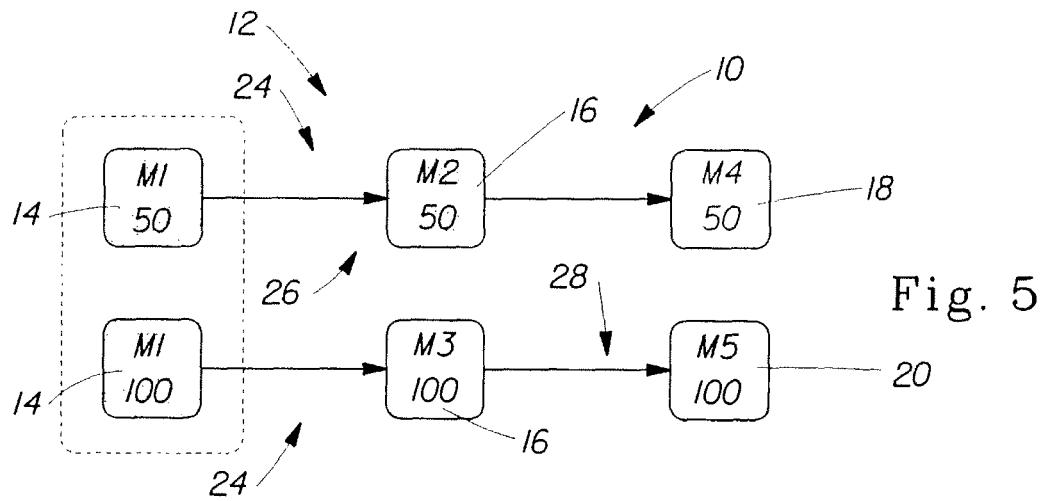

Referring to FIG. 5, one next identifies the specific machinery common to more than one independent path 24. As shown in the figure, the log saw 14 (M1) is common to both the upper independent path 26 and the lower independent path 28.

Figure 6:
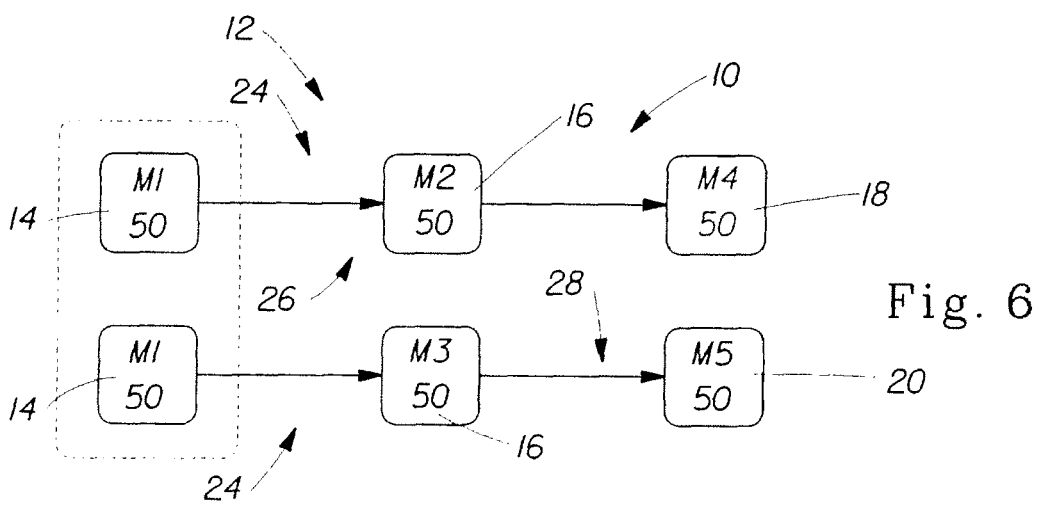

Referring to FIG. 6, for machines that are common to more than one independent path 24, the lowest target rate for the respective independent path 24 to which that machine appears is identified. By way of example and as shown in FIG. 5, it can be seen that one portion of the log saw 14 (M1) has a lower target rate in the upper independent path 26 compared to the higher target rate shown in the lower independent path 28. For each independent path 24 that the common machine occupies, the independent paths where the target rate exceeds the lowest target rate identified previously is scaled so that the output of the common machine provides an even distribution of the consumer-ready finally wound product produced therefore between the independent paths 24 in common. One of skill in the art would recognize that such a step may be required because production machines are often required to distribute such consumer-ready finally wound product in even proportions. Thus, for example, since the lowest target rate was identified as the target rate for the upper independent path 26 comprising log saw 14 (M1), the target rate of the log saw 14 (M1) in the lower independent path 28 is adjusted commensurate in scope with the target rate provided in the upper independent path 26 comprising log saw 14 (M1). As shown in FIG. 6, the target rate of log saw 14 (M1) to the lower independent path 28 comprising log saw 14 (M1), wrapper 16 (M3), and case packer 20 (M5) is adjusted to the same rate (50) as the upper independent path 26 comprising log saw 14 (M1), wrapper 16 (M2), and bundler 18 (M4). In short, the throughput of all machines in system 12 comprising process 10 is adjusted to be the same as the lowest rate of the available components comprising system 12. It should be realized by one of skill in the art that the preceding steps can be repeated as required to accommodate machinery that may be common to more than independent path 24 and can be utilized in systems 12 that may distribute consumer-ready final product in even proportions. In the non-limiting, but exemplary circumstance that a machine must distribute or receive consumer-ready final product in uneven proportions, these percentages should be defined and are initially applied when distributing the component's maximum rate among each independent path 24 in which it appears. Subsequently, the process utilized in systems 12 utilizing such uneven proportion distributions should be reconfirmed in this step using a similar process to that described for a system 12 utilizing even proportion distribution. In a second non-limiting, but exemplary circumstance that a machine is able to distribute or receive consumer-ready finally wound product in variable proportions, the maximum rate initially distributed among each independent path 24 in which it appears may be as high as the machine's throughput capacity in each instance. This is because at any given instance the machine may be able to accept or distribute its full capacity from/to a single independent path.

Figure 7:
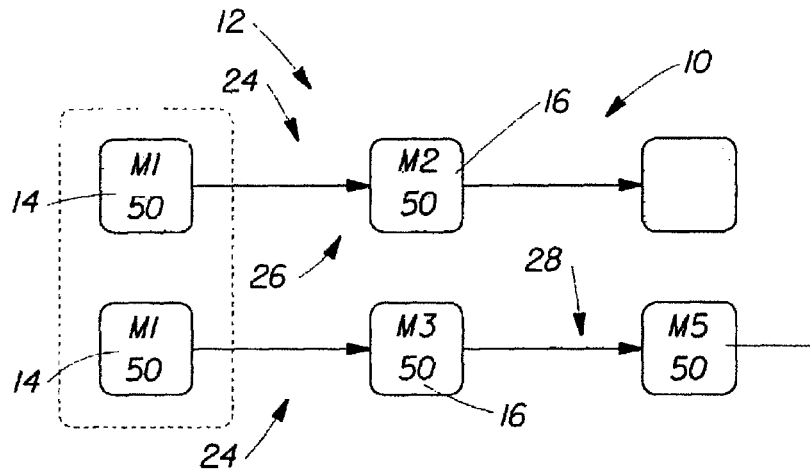

Next, referring to FIG. 7, the state of each independent path 24 is identified. If any machine on an independent path 24 is stopped, the respective independent path 24 would be considered in a "down" state. As shown in FIG. 7, upper independent path 26 comprising log saw 14 (M1), wrapper 16 (M2), and bundler 18 (M4) is down due to some situation affecting the upper independent path 24. This may include, for example, preventive maintenance occurring on bundler 18 (M1) or an equipment malfunction related to the operation of bundler 18 (M4). In the example shown in FIG. 7, the lower independent path 28 comprising log saw 14 (M1), wrapper 16 (M3), and case packer 20 (M5) remains in operation.

Figure 8:
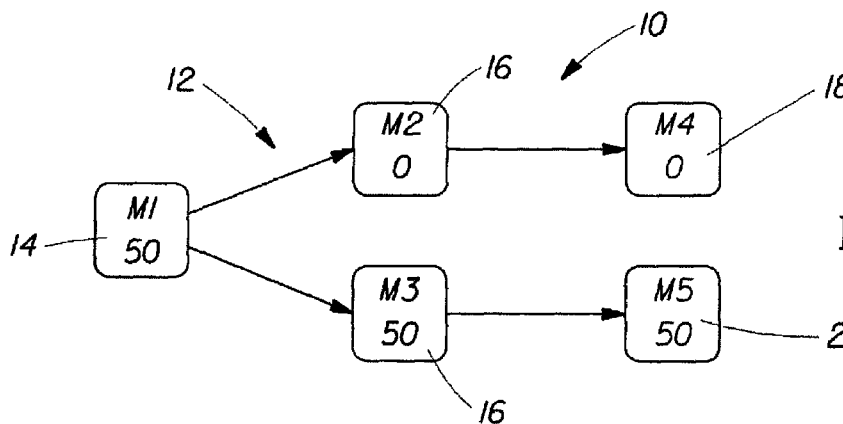

Referring to FIG. 8, all of the independent paths 24 are reconstituted or resolved into their pre-process configuration. For a machine common to multiple independent paths 24, the target rate for that machine is the sum of all target rates for each machine instance among the independent paths, provided the particular independent path 24 is in an operating state. Thus, the target rates for the instantaneous operating capacity of each machine comprising system 12 are then implemented in order to provide for maximum throughput through system 12. Referring back to FIG. 7, if the upper independent path 26 comprising log saw 14 (M1), wrapper 16 (M2), and bundler 18 (M4) is in a down state, the reconstituted machine target rates are then taken into account to adjust the throughput of system 12. Thus, since the upper independent path 26 comprising log saw 14 (M1), wrapper 16 (M2), and bundler 18 (M4) is not in operation, all output from log saw 14 (M1) is directed toward wrapper 16 (M3), and case packer 20 (M5). This situation requires the output of log saw 14 (M1) to be reduced to a level that is only required to support the equipment present in lower independent path 28. Thus, even though the capacity of log saw 14 (M1) is far in excess of the realized output according to the process 10 described herein, the output of the log saw 14 (M1) is reduced and the output of all other equipment in system 12 is maintained, thus maintaining the throughput of the lower independent path 28, to accommodate an instantaneous interruption in production due to a malfunction of one of the components of system 12. By maintaining the throughput of the lower independent path 28, the lower independent path 28 is not exposed to a rate-change condition, which could otherwise increase the probability of a failure. Similarly, if the upper independent path 26 having log saw 14 (M1), wrapper 16 (M2), and bundler 18 (M4) is in operation, the reconstituted machine target rates would provide for the log saw 14 (M1) to provide for an equal distribution of consumer-ready finally wound product to the respective wrapper 16 (M2) disposed in each independent path 24. Thus, using the example shown in FIG. 8, the target rate of log saw 14 (M1) could be adjusted to a value of 50 units/minute in order to satisfy the throughput of just the lower independent path 28 as shown in FIG. 6 since it is the only independent path 24 remaining in operation.

If a given independent path 28 is to be in a "down" state for an extended time period, or if other process conditions dictate, such as an accumulation or queue level of consumer-ready finally wound product, it may be advantageous to increase the speed of the remaining independent paths 24 to compensate for this situation. This operational mode is referred to herein as "speed-compensating." In this operational mode it may be deemed necessary to accept the increased risk in reliability to speeding up the operations associated with the remaining independent paths 24 in order to achieve higher throughput. In order to cause this change, it could be necessary to ignore the independent path 28 currently in the "down" state by excluding independent path 28 from the initial distribution of each operating stations's maximum rate among each independent path 24 in which the operating station occurs. The system 10 may go into a speed-compensating mode either automatically, in which case it is typically triggered by a certain accumulation or queue level, or manually by the operator through the operator interface.

Figure 9:
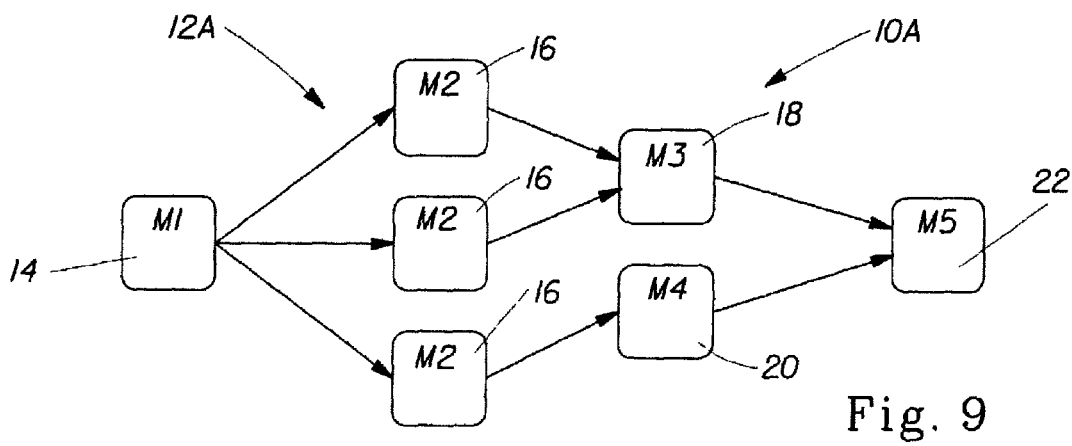
FIG. 9 is a block diagram of another exemplary manufacturing system.

As shown in FIG. 9, exemplary system 12A suitable for use with process 10A of the present invention to produce consumer-ready finally wound product provides for a log saw 14 (M1) to feed the input of a plurality of wrappers 16 (M2). The output of two wrappers 16 (M2) feed the input of a bundler 18 (M3). The output of a third wrapper 16 (M2) feeds the input of a case packer 20 (M4). The resulting outputs of both the bundler 18 (M3) and case packer 20 (M4) feed the input of a palletizer 22 (M5).

Figure 10:
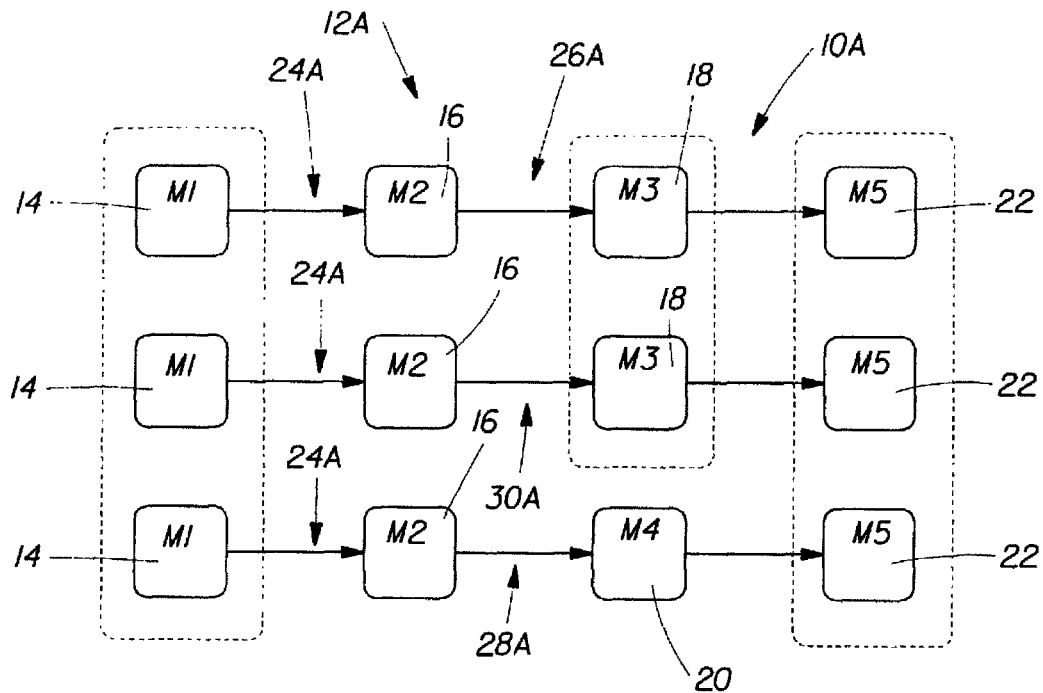
FIGS. 10-17 are block diagrams representing the steps of the instant invention that can maximize production throughput of the exemplary manufacturing system of FIG. 9 as well as accommodate for the interruption of service due to a planned or unplanned intervention or failure of equipment used to manufacture the consumer-ready finally wound product contemplated herein.

Consistent with the process described herein, in this more complex system as shown in FIG. 10, the process 10A of the instant invention provides that the system 12A be displayed as a plurality of independent paths 24A in which a consumer-ready finally wound product may progress through system 12A. As shown, since more than one unit operation comprising system 12A provides for relative distribution of the output therefrom to a plurality of devices, the system 12A can be represented as a plurality of independent paths 24A. In other words, each unit operation comprising system 12A is represented by each independent path 24A through which the consumer-ready finally wound product may progress through system 12A. Thus, upper independent path 26A can be represented by a consumer-ready finally wound product that can progress from the output of log saw 14 (M1), to a first wrapper 16 (M2), then a bundler 18 (M3), and subsequently a palletizer 22 (M5). Alternatively, the consumer ready finally wound product may progress through system 12A in middle independent path 30A from the output of log saw 14 (M1) to a second wrapper 16 (M2), then to bundler 18 (M3), and subsequently palletizer 22 (M5). Yet further still, the consumer-ready finally wound product may progress through system 12A in lower independent path 28A from the output of log saw 14 (M1) to a third wrapper 16 (M2) to a case packer 20 (M4) and a subsequent palletizer 22 (M5).

Figure 11:
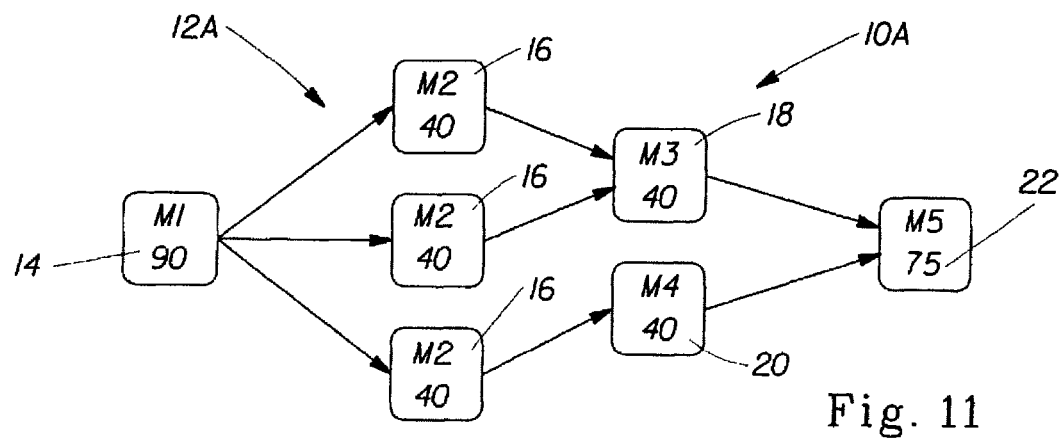

Referring to FIG. 11, the throughput capacity of each unit operation of system 12A is then determined. As discussed supra, this information can be provided by the manufacturer of the specific piece of equipment or may be realized through use and experience as an evaluative known output of the unit operation. By way of example, the known capacity of log saw 14 (M1) may be 90 units per minute. Similarly, it may be determined that the capacities of each wrapper 16 (M2), the bundler 18 (M3), and the case packer 20 (M4) may be 40 units per minute, respectively. Further, the capacity of palletizer 22 (M5) may be known to be 75 units per minute. As stated above, the throughput capacities at each position of the system 12A is likely to be maximum rate for the specific equipment for the given format of consumer-ready finally wound product, as well as any system 12A conditions that may be present.

Figure 12:
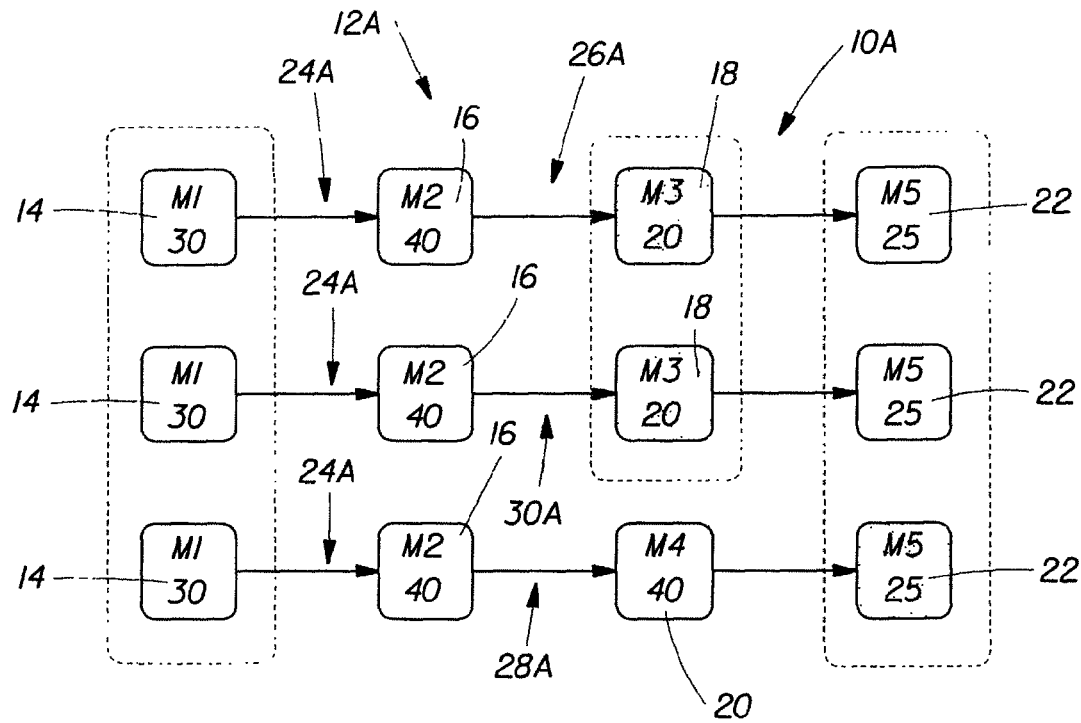

Referring to FIG. 12, the constraining capacity of each independent path 24A is identified. As shown, the constraint of the upper independent path 26A would be identified as the bundler 18 (M3). This is because the throughput capacity of the bundler 18 (M3) is the lowest throughput capacity of all equipment present in the upper independent path 26A. The constraint in the middle independent path 30A is likewise the bundler 18 (M3). The observed constraint in the lower independent path 28 A is the palletizer 22 (M5).

Figure 13:
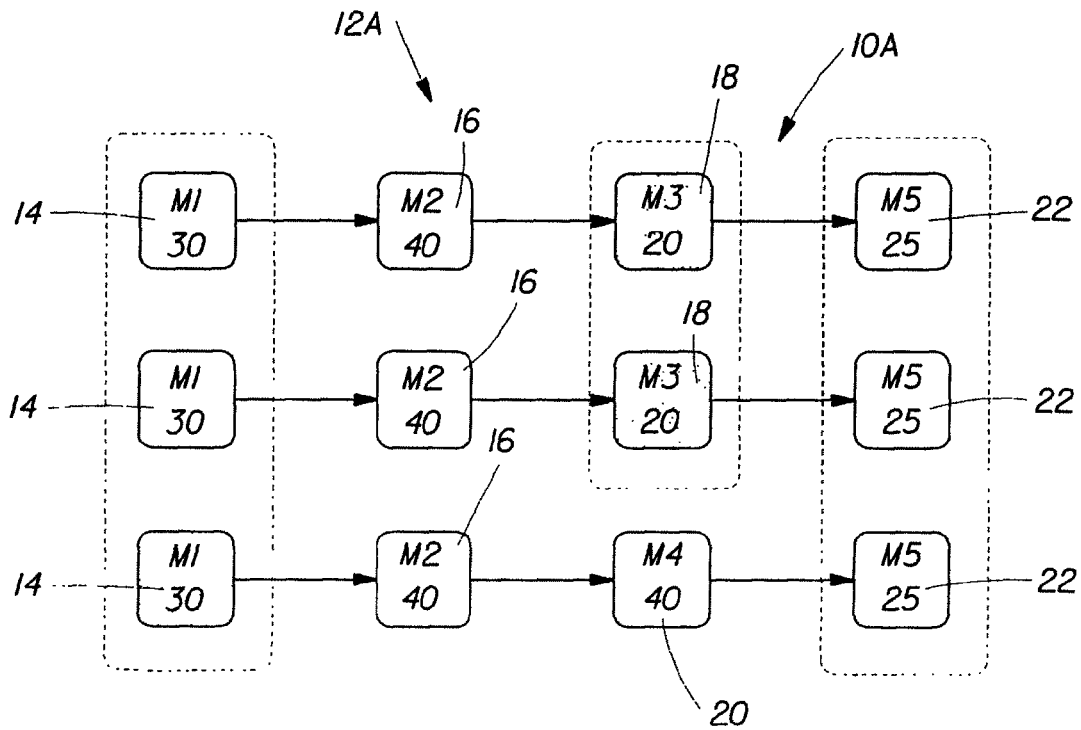
Figure 14:
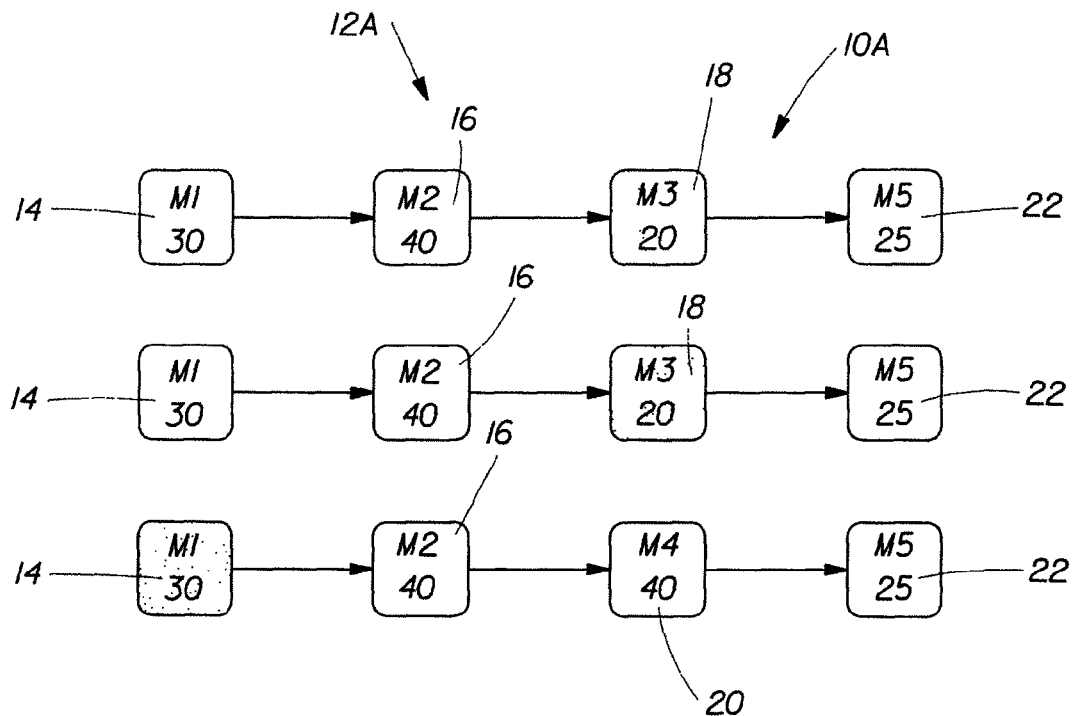

Referring to FIG. 13, in the instance where a common operating station is shared over a plurality of independent paths 24A, it may be useful to shift the constraining capacity from one unit operation in a given independent path 24A to another unit operation in that same independent path 24. As shown in FIG. 13, since the lower independent path 28A shares a common operating station (log saw 14 (M1)) with both the upper independent path 26A and the middle independent path 30A, the constraint is shifted to the log saw 14 (M1). This is because the upper independent path 26A and middle independent path 30A have lower constraint values as compared with the constraint value presented by palletizer 22 (M5) shown in the lower independent path 28A, and assuming the logsaw 14 (M1) is required to split its output proportionally. Thus, for purposes of this example, the constraining rate for the lower independent path 28A effectively becomes the log saw 14 (M1). Thus, the independent paths 24A shown in FIG. 13 can be represented as three independent paths 24A with the constraining rates displayed as shown in FIG. 14.

Next, a speed trimming percentage is applied to each independent path 24A because, as would be known to one of skill in the art, many unit operations (e.g., the wrappers 16 (M2)) monitor their in-feed level in order to adjust their speed to maintain a consistent throughput level. "Speed trimming" or "speed compensation" as used herein refers to these small speed compensations required to maintain a consistent in-feed level in any given unit operation. The term "high trim" as used herein refers to a state in which any given unit operation has excess product at its in-feed and therefore runs at a speed incrementally lower than a cooperatively associated upstream unit operation. Likewise, the term "low trim" as used herein refers to the state in which a given unit operation has a deficiency of product at its in-feed and therefore runs at a speed incrementally higher than a cooperatively associated upstream unit operation.

One aspect of the system of the present invention provides for speed trimming to be applied for each independent path 24A from the constraining unit operation outward. For example, a unit operation positioned downstream of the constraining unit operation on a given independent path 24A and it detects a high trim or low trim condition, the speed trimming percentage can be applied to that unit operation and then propagate downstream. However, if the unit operation is the constraint, or is upstream of the constraint, and a high or low trim condition is detected, the speed trimming percentage can be applied to the upstream unit operation and then propagate further upstream. In this way, and without desiring to be bound by theory, the speed of the constraint can be maximized. It was found that traditional approaches typically apply speed trimming locally to the downstream detecting unit operation, regardless of the location relative to the constraint, and typically do not propagate downstream, thus requiring the constraint to run below its maximum speed unless the constraint happens to be the upstream-most unit operation.

Thus, it should be realized that nearly all transfer of consumer-ready finally wound product between each component of the system 12A would behave as a constant density transport conveyor. In other words, the conveyor starts, stops, and changes speed in conjunction with the upstream machine in order to maintain a constant product density. It should also be realized that this strategy also allows all machines within the system 12A to change speed simultaneously. It is believed that a key benefit of this approach is that all conveyor states and speeds within system 12A are calculated based on product density, unit operation speed, and the individualized consumer ready product recipe. In this way, the identical, standard logic is used for every conveyor in the system, enabling a variety of configurations and avoiding custom logic for each conveyor motor. This standard logic allows flexibility and scalability; for example, a conveyor may be added or removed to/from the system 12A without impacting the logic. The traditional approach of custom logic for each motor requires a significant amount of programming, is prone to errors, and difficult to troubleshoot.

Without desiring to be bound by theory, it is believed that the following equation is used to calculate the speed for a transport conveyor:

$$S_{TC} = R_{US} \times (1 \div X)/(L \times D);$$

where:
$S_{TC}$=transport conveyor speed (in distance/minute);
$R_{US}$=upstream machine rate (in units/minute);
l=product length (in distance/product) in the direction of travel;
X=product roll count (in units/product);
L=number of simultaneous lanes of product (#); and
D=target product density (%).

In addition to any transport conveyors used in system 12A, a process constraint may require additional conveyor types, for example accumulating and fixed speed. Accumulating conveyors behave like transport conveyors except that they follow the downstream machine. Fixed speed conveyors always run a fixed speed. Also, a given unit operation may require a certain amount of clean-out when shutting down. If this is the case, the conveyor(s) immediately downstream of the unit operation should continue to run for a certain amount of time after the respective unit operation shuts down.

In order to account for any variations in rates and product properties, and in order to be certain that a conveyor is operating within an acceptable speed range, the target product density in the equation above may need to be adjusted on a case-by-case basis. Preferably, this adjustment occurs automatically in the algorithm in order to ensure the calculated speed does not fall outside the acceptable range for the motor or drive. If so, the constant density of product on the conveyor will be jeopardized and unnecessary speed changes on the unit operations may occur.

When restarting the system 12A, if any active unit operation is starved (i.e. lacking adequate quantity of product at its in-feed or in queue in order to run) for consumer-ready finally wound product, the target speeds for the associated independent paths 24A are reduced to a low speed as defined in the master operator interface for each consumer-ready finally wound product recipe. The low speed start-up value is typically about half the steady state speed and is defined as a percentage of full speed. As is known to those of skill in the art, low speed start-up is critical in a close-coupled system 12A because it allows the downstream starved operating station to ramp up to a matched speed with the upstream machine cooperatively coupled and associated thereto without blocking it (i.e., filling the downstream conveyor or queue such that the machine must stop). This "throughput reduction factor" is preferably applied to all discrete operating stations within each associated independent path 24A in order to facilitate system 12A trouble-shooting, re-starting, or other conditions consistent with a reduced operation and resulting output of system 12A.

Once all the unit operations associated with system 12A are satisfied and at rate, the machine target rates will increase to full speed after a pre-set time delay as defined in the master operator interface for each consumer-ready finally wound product recipe. Preferably the target rates and acceleration/deceleration rates for all unit operations and conveyors associated with system 12A are provided from a single master control unit in order to best maintain product density on the conveyors. Note that a unit operation that is starved should use the maximum possible acceleration rate in order to minimize any accumulation at the in-feed as the unit operation ramps up. If any machine in system 12A starves while in the steady state full speed running condition, the target rates will revert back to the low speed start-up values. This can occur, for example, when off-quality consumer-ready finally wound product is being generated and removed from a conveyor within system 12A. Depending on process behavior, namely the variation in speeds, rates, and product density upon restart and unit operation reliability during acceleration, it may be desirable to apply low speed startup when recovering from all "down" states.

In a dual pack system 12A with a shared unit operation downstream, it may not be possible to have one independent path 24A at a steady state full speed condition and another independent path 12A in a low speed start-up mode. This is typically due to the downstream unit operation not being able to merge incoming streams of dramatically different rates. An excellent example of this is two wrappers 16 (M2) feeding a single bundler 18 (M3), as shown in the instant example. If the bundler 18 (M3) is running a format that requires two in-feed lanes, it may not be able to handle dramatically different in-feed rates. On the other hand, for one or three in-feed lanes, the rate variation may be acceptable. For this reason, an operator of system 12A can select which operational mode, either low speed startup by path or for the entire system 12A, is desired in the master operator interface.

Speed trimming occurs in the master control unit and not the individual machinery comprising system 12A. In order to allow the system 12A constraint to run at full rate and maximize throughput of consumer-ready finally wound product, the constraint unit operation speed is never trimmed. Rather, when a low trim condition occurs at the constraint, the corresponding upstream module goes into high trim. Likewise, for high trim condition at the constraint or upstream of the constraint, the corresponding upstream module goes into low trim.

Thus, if a module associated with an independent path 24A of system 12A is downstream of the constraint in a particular independent path 24A, the independent path 24A uses its local in-feed level to determine its speed trimming mode. If an operating station is upstream of the constraint, it uses the in-feed level of the corresponding downstream unit operation to determine its speed trimming mode. Recall that speed trimming modes are high trim and low trim, where high trim indicates the downstream machine should run faster than the upstream machine, and low trim indicates the upstream should run faster.

To minimize cycling between the trim modes, a particular unit operation should remain in a high or low trim for a minimum amount of time. The "minimum time in high trim" and "minimum time in low trim" parameters can be set in the master operator interface and are not necessarily specific to the consumer-ready finally wound product. High trim is preferably disabled while in low speed start-up mode, since the in-feed level usually increases after a stop as upstream conveyors run longer to clean-out the unit operation and/or clear back-up or blocked photoeyes.

Figure 15:
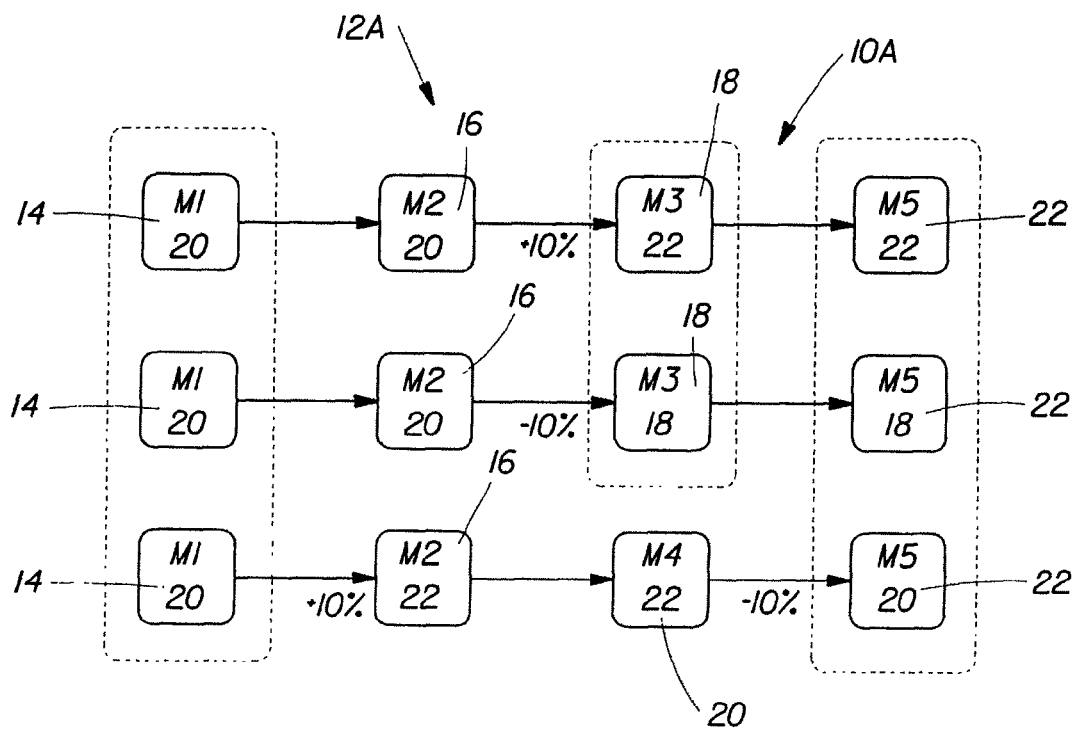

Thus, referring to FIG. 15, speed trimming is applied working outward from the constraint for each independent path 24A. By way of example, a proportional consumer-ready product split is applied to the log saw 14 (M1) and the constraint is satisfied on the bundler 18 (M3). This effectively reduces the throughput of the lower independent path 28A such that the target rate for the log saw 14 (M1) on the lower independent path 28A is 20 units/min.

Figure 16:
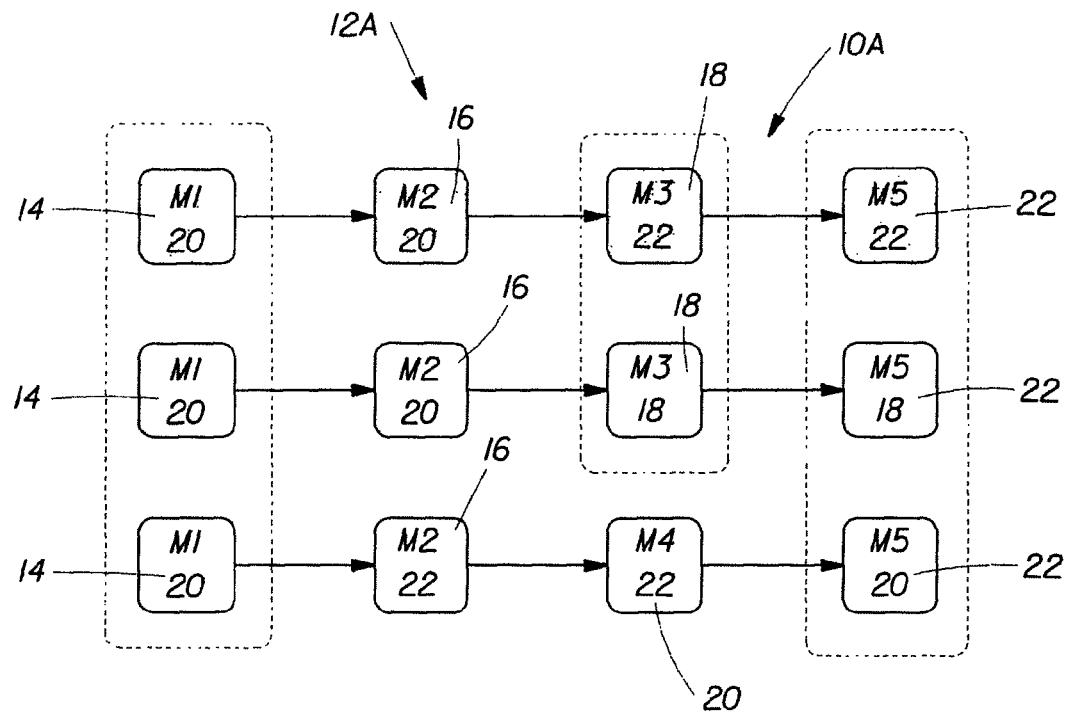
Figure 17:
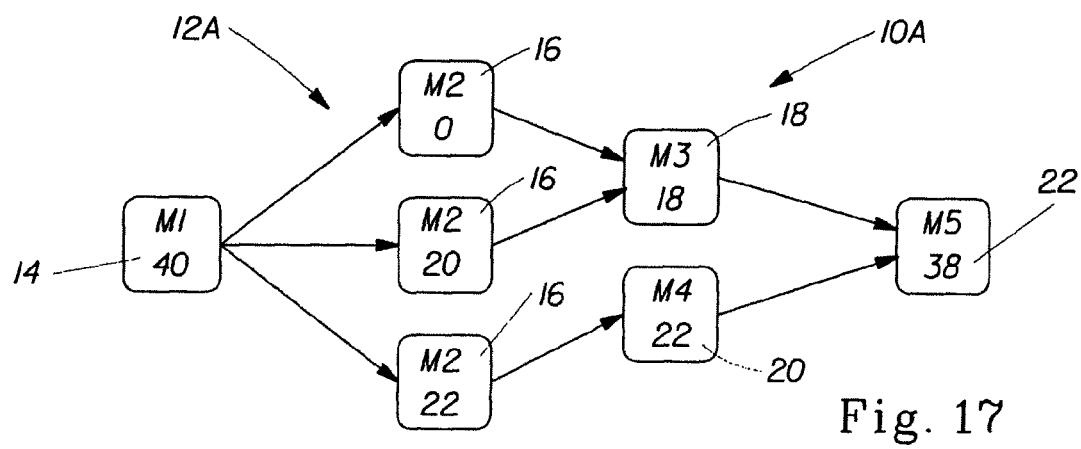

Next, referring to FIG. 16, the state of each independent path 24A is identified. If any machine on an independent path 24A is stopped, or any conveyor or queue between unit operations on that path is jammed or faulted, that particular independent path 24A is considered to be in a "down" state. By way of non-limiting example, if the upper independent path 26A shown in FIG. 16 comprising log saw 14 (M1), wrapper 16 (M2), bundler 18 (M3), palletizer 22 (M5) is in a "down" state, the reconstituted machine target rates are then taken into account to adjust the throughput of system 12A. It then follows that the independent paths 24A are then reconstituted or resolved into their pre-process configuration. For a machine common to multiple independent paths, the target rate for the machine is the sum of all target rates for each machine instance among the independent paths, provided the path is in an operating state. Thus, the target rates for the instantaneous operating capacity of each machine comprising system 12A are then implemented in order to provide for maximum throughput through system 12A. Thus, if the upper independent path 26A comprising log saw 14 (M1), wrapper 16 (M2), bundler 18 (M3), and palletizer 22 (M5) is in a "down" state, the reconstituted machine target rates are then taken into account to adjust the output of system 12A. Thus, since the upper independent path 26A comprising log saw 14 (M1), wrapper 16 (M2), bundler 18 (M3), and palletizer 22 (M5) is not in operation, all output from log saw 14 (M1) is directed toward the second wrapper 16 (M2) and the third wrapper 16 (M2) and eventually to bundler 18 (M3), case packer 20 (M4), and palletizer 22 (M5), comprising, respectively, middle independent path 30A and lower independent path 28A. Thus, even though the capacity of log saw 14 (M1) is far in excess of the realized output according to the process 10A described herein, the output of log saw 14 (M1) is reduced and the output of the remaining equipment comprising system 12A is maintained as possible to accommodate an instantaneous interruption in production due to a malfunction of one of the components of system 12A. Thus, using the example exhibited in FIGS. 9 through 17, the target rate of log saw 14 (M1) could be adjusted to a value of 40 units/minute in order to satisfy the capacity of both independent paths remaining operational as shown in FIG. 17. As discussed previously, if the system 12A were in speed-compensating mode, the outcome could be different in order to maximize throughput instead of maintaining rate on the running, and unaffected, unit operations.

In a preferred embodiment, special cases can exist where part of an independent path 24A may be considered "down" and another part of independent path 24A "operating" for purposes of reconstituting the unit operation target speeds. Exemplary and non-limiting cases can include: (Note: Low Speed Startup should be Applied in these Cases)

1) Unit operations upstream of a "blocked" unit operation are "down." Those unit operations downstream are considered "running." This way the downstream unit operations can attempt to clear the blocked condition.
2) Unit operations downstream of a "starved" unit operation are "down." Those unit operations upstream are considered "running." This way the upstream unit operations can provide product to the starved machine. Note that a true starved condition is not part of the normal machine process. For example, some case packers may have a short "waiting" period at the beginning of every cycle as it waits for product to enter the lifting chamber. In this instance, this should not be reported as a "starved" event.
3) A unit operation that is in jog mode is considered to be "down," therefore causing any independent paths 24A on which it resides to be "down." However, if the unit operation is in jog mode and requires additional product at its in-feed (as determined from its in-feed monitoring sensors, typically photoeyes), the unit operations upstream of the jogging machine are considered "running."
4) For purposes of multiple special cases, "down" takes precedence over "running." For example, if there was a blocked unit operation on a path and further downstream a starved unit operation, only the unit operations in between would be in the special "running" state.

The dimensions and/or values disclosed herein are not to be understood as being strictly limited to the exact dimension and/or numerical values recited. Instead, unless otherwise specified, each such dimension and/or value is intended to mean both the recited dimension and/or value and a functionally equivalent range surrounding that recited dimension and/or value. For example, a dimension disclosed as "40 mm" is intended to mean "about 40 mm."

Every document cited herein, including any cross referenced, related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process to control product throughput in a multi-station manufacturing system, the process comprising the steps of:
   (a) providing said multi-station manufacturing system as a plurality of discrete operating stations, each of said plurality of discrete operating stations having a known rate capacity and being interconnected to form a plurality of pathways for an object of manufacture to pass through said multi-station manufacturing system from a first operating station to a distal operating station;
   (b) separating said plurality of pathways into a plurality of independent pathways;
   (c) identifying a first constraining throughput capacity corresponding to each of said plurality of independent pathways;
   (d) adjusting a target rate of each of said discrete operating stations in each of said plurality of independent pathways according to said corresponding first constraining throughput capacity;
   (e) reconstituting said plurality of independent pathways into said interconnected pathway comprising said discrete operating stations and re-forming said plurality of pathways for said object of manufacture to pass through said multi-station manufacturing system from said first operating station to said distal operating station;
   (f) combining the target rate of each of said discrete operating stations of said interconnected pathway; and,
   (g) adjusting the product throughput according to the combined target rates.

2. The process of claim 1 wherein said step (b) further comprises the step of dividing said known rate capacity of each discrete operating station between each occurrence of said operating station within said plurality of independent pathways.

3. The process according to claim 1, further comprising the step of:
   (h) prior to step (e), identifying a second constraining throughput capacity for discrete operating stations common to at least two of said independent pathways.

4. The process according to claim 3 wherein said step (h) further comprises the step of identifying said second constraining throughput capacity for discrete operating stations common to each of said independent pathways for which distribution of product by said discrete operating station disposed across each of said independent pathways must occur in a defined proportion.

5. The process according to claim 3, further comprising the step of:
   (i) after step (h), adjusting said target rate of each of said discrete operating stations in said multi-station manufacturing system according to said second constraining throughput capacity.

6. The process according to claim 5, wherein said step (i) further comprises the step of adjusting said target rate of each of said discrete operating stations in said multi-station manufacturing system according to said second constraining throughput capacity when said throughput capacity is proportionally distributed as required by each of said discrete operating stations.

7. The process according to claim 1, further comprising the step of:
   (j) dividing said target rate of said each discrete operating station by a maximum rate capacity of said discrete operating station thereby determining a capacity utilization factor for each of said discrete operating stations.

8. The process according to claim 7, further comprising the step of:
   (k) after step (j), identifying a maximum utilization factor among all discrete operating stations according to said capacity utilization factor and dividing said target rate of each of said discrete operating stations in said plurality of independent pathways by said maximum utilization factor.

9. The process according to claim 1 further comprising the step of:
   (l) scaling said target rate of a discrete operating station identified as said first constraining throughput capacity and adjusting said target rates of each of said discrete operating stations in said plurality of independent pathways according to said scaled target rate to not exceed said first constraining throughput capacity.

10. The process according to claim 1, further comprising the step of:
    (m) prior to step (e), identifying a third constraining throughput capacity, said third constraining throughput capacity being determinative if one of said independent pathways comprising said discrete operating station is not operating.

11. The process according to claim 10, further comprising the step of:
    (n) after step (e), adjusting said target rate of each of said discrete operating stations that is not operating to zero.

12. The process of claim 1 wherein said step of separating said plurality of pathways into a plurality of independent pathways includes the step of not dividing said known rate capacity of each discrete operating station between each occurrence of said discrete operating station in said plurality of independent pathways.

13. The process according to claim 1, further comprising the step of
    (o) before step (e), determining a speed trimming percentage.

14. The process according to claim 13 wherein said step (o) further comprises the step of applying said speed trimming percentage to each of said discrete operating stations.

15. The process according to claim 13 wherein said step (o) further comprises the step of applying said speed trimming percentage to each of said discrete operating stations cooperatively associated and disposed upstream from said first constraining throughput capacity and to each of said discrete operating stations cooperatively associated and disposed downstream from said first constraining throughput capacity.

16. The process according to claim 1, further comprising the step of:
    (p) applying a throughput reduction factor to said discrete operating stations.

17. The process according to claim 1, further comprising the step of:
    (q) after step (b), disregarding any independent pathway of said plurality of independent pathways comprising a non-operating discrete operating station.

18. A process to control product throughput in a multi-station manufacturing system, the process comprising the steps of:
    (a) providing said multi-station manufacturing system as a plurality of discrete operating stations, each of said plurality of discrete operating stations having a known rate capacity and being interconnected to form a plurality of pathways for an object of manufacture to pass through said multi-station manufacturing system from a first operating station to a distal operating station;
    (b) separating said plurality of pathways into a plurality of independent pathways;
    (c) identifying a first constraining throughput capacity corresponding to each of said plurality of independent pathways;
    (d) adjusting a target rate of each of said discrete operating stations in each of said plurality of independent pathways according to said corresponding first constraining throughput capacity;
    (e) identifying a second constraining throughput capacity for discrete operating stations common to each of said independent pathways;
    (f) adjusting said target rate of each of said discrete operating stations in said multi-station manufacturing system according to said second constraining throughput capacity; and,
    (g) reconstituting said plurality of independent pathways into said interconnected pathway comprising said discrete operating stations and re-forming said plurality of pathways for said object of manufacture to pass through said multi-station manufacturing system from said first operating station to said distal operating station;
    (h) combining the target rate of each of said discrete operating stations of said interconnected pathway; and,
    (i) adjusting the product throughput according to the combined target rate.

19. The process according to claim 18, further comprising the step of identifying a third constraining throughput capacity, said third constraining throughput capacity being determinative if one of said independent pathways having said discrete operating stations in common is operating.

20. The process according to claim 19, further comprising the step of adjusting said rate capacity of each of said discrete operating stations in said multi-station manufacturing system according to said third constraining throughput capacity.

* * * * *

UNITED STATES PATENT AND TRADEMARK OFFICE
CERTIFICATE OF CORRECTION

PATENT NO. : 7,818,081 B2  Page 1 of 1
APPLICATION NO. : 12/122953
DATED : October 19, 2010
INVENTOR(S) : Overley et al.

It is certified that error appears in the above-identified patent and that said Letters Patent is hereby corrected as shown below:

In the title of the Application, delete the word "DISCREET" and add the word <u>DISCRETE</u>

Col. 10, l. 13, delete the word "higher" and add the word <u>lower</u> after the word "incrementally"

Signed and Sealed this
Twenty-second Day of February, 2011

David J. Kappos
*Director of the United States Patent and Trademark Office*